United States Patent [19]

Hirano et al.

[11] Patent Number: 4,926,716
[45] Date of Patent: May 22, 1990

[54] METHOD OF CONTROLLING CONTINUOUSLY VARIABLE TRANSMISSION SYSTEM

[75] Inventors: Sadayuki Hirano; Katsuaki Murano; Yoshinori Yamashita, all of Shizuoka; Takumi Tatsumi; Hiroaki Yamamoto, both of Hyogo, all of Japan

[73] Assignees: Suzuki Jidosha Kogyo Kabushiki Kaisha, Shizuoka; Mitsubishi Denki Kabushiki Kaisha, Tokyo, both of Japan

[21] Appl. No.: 229,899

[22] Filed: Aug. 8, 1988

[30] Foreign Application Priority Data

Aug. 10, 1987 [JP] Japan .................... 62-199411

[51] Int. Cl.$^5$ .............................................. B60K 41/16
[52] U.S. Cl. ...................................... 74/866; 364/424.1
[58] Field of Search ...................... 74/865, 866, 861; 364/424.1

[56] References Cited

U.S. PATENT DOCUMENTS

| 4,637,279 | 1/1987 | Itoh et al. ........................... 74/866 |
| 4,649,485 | 3/1987 | Osanai et al. ..................... 364/424.1 |
| 4,653,005 | 3/1987 | Osanai et al. ..................... 364/424.1 |
| 4,656,587 | 4/1987 | Osanai et al. ..................... 74/866 X |
| 4,689,745 | 8/1987 | Itoh et al. ........................ 74/866 X |
| 4,715,258 | 12/1987 | Shigematsu et al. ................. 74/866 |
| 4,735,112 | 4/1988 | Osanai et al. ........................ 74/866 |
| 4,735,114 | 4/1988 | Satoh et al. ........................... 74/866 |
| 4,743,223 | 5/1988 | Tokoro et al. ..................... 74/856 X |
| 4,764,155 | 8/1988 | Kumura et al. ................... 474/17 X |

FOREIGN PATENT DOCUMENTS

| 57-186656 | 11/1982 | Japan . |
| 59-43249 | 3/1984 | Japan . |
| 59-77159 | 5/1984 | Japan . |
| 61-233256 | 10/1986 | Japan . |

Primary Examiner—Dwight G. Diehl
Assistant Examiner—Chris Campbell
Attorney, Agent, or Firm—Flynn, Thiel, Boutell & Tanis

[57] ABSTRACT

A novel method of controlling a continuously variable transmission system by executing sequential steps including delivering a throttle-aperture detection signal and a vehicle-speed detection signal to a controller unit; determining an optimum objective number of engine revolution in reference to a first objective number of engine revolution set by the throttle-aperture detection signal and a second-objective number of engine revolution set by the vehicle-speed detection signal and in accordance with an instruction limiting the number of engine revolution at the shift position; and executing control of the transmission system in response to the vehicle-speed detection signal.

6 Claims, 3 Drawing Sheets

METHOD OF CONTROLLING CONTINUOUSLY VARIABLE TRANSMISSION SYSTEM

CROSS REFERENCE TO RELATED APPLICATIONS

This application is related to our copending applications filed concurrently herewith and entitled (1) METHOD OF CONTROLLING CLUTCH OF CONTINUOUSLY VARIABLE TRANSMISSION SYSTEM U.S. Ser. No. 229,909, (2) METHOD OF CONTROLLING LINE PRESSURE OF CONTINUOUSLY VARIABLE TRANSMISSION SYSTEM U.S. Ser. No. 229,900, (3) METHOD OF CONTROLLING CLUTCH PRESSURE OF CONTINUOUSLY VARIABLE TRANSMISSION SYSTEM U.S. Ser. No. 229,893 now U.S. Pat. No. 4,856,380 and (4) HYDRAULIC CONTROL METHOD FOR CONTINUOUSLY VARIABLE SPEED CHANGE GEAR MECHANISM FOR A VEHICLE AND A DRIVE CONTROL METHOD FOR A PRESSURE VALVE THEREOF, U.S. Ser. No. 229,942. The disclosures of these copending applications are incorporated herein by reference.

FIELD OF THE INVENTION

The present invention relates to a method of controlling a continuously variable transmission system and, more particularly, to a method of controlling a continuously variable transmission system which allows a specific driving characteristic to be generated in response to a vehicle-speed detection signal and varies responsiveness by setting an objective number for the engine revolution so that a specific driving characteristic as required by the driver can eventually be materialized.

BACKGROUND OF THE INVENTION

The conventional vehicle is provided with a transmission system between the internal combustion engine and the driving wheels. The conventional transmission system varies the driving force and wheel speed in accordance with widely variable driving conditions of the vehicle itself to allow the engine to fully develop its own performance. There are a variety of continuously variable transmission systems like those which are disclosed in official publications of Japanese Patent Laid-Open Nos. 57-186656 (1982), 59-43249 (1984), 59-77159 (1984), and 61-233256 (1986) for example. Any of these conventional continuously variable transmission systems transmits the driving force by either expanding or contracting the radius of belt rotation by either expanding or contracting the width of the belt channel formed between a stationary pulley member secured to the revolving shaft and a movable pulley member mounted axially movably to the revolving shaft so that it can come into contact with and leave the stationary pulley shaft for varying the belt drive ratio.

Any conventional continuously variable transmission system is subject to feedback control against an objective value set by applying either the number of the engine revolution or the belt drive ratio determined by the throttle aperture while controlling the transmission system. As a result, any conventional transmission system executes control over the transmission against the objective value independent of the shift position. This in turn prevents the conventional transmission control system from freely choosing a variety of transmission characteristics from the standpoint of economical driving performance, sporty performance, and engine-brake effect, and at the same time the driving characteristic required by the driver cannot be satisfactorily achieved.

An object of the invention is to overcome those disadvantages mentioned above by providing a novel method of controlling a continuously variable transmission system by executing sequential steps including the following: delivering a throttle-aperture detection signal and a vehicle-speed detection signal to a controller unit; determining an optimum objective number of engine revolution in reference to a first objective number of engine revolution set by the throttle-aperture detection signal and a second-objective number of engine revolution set by the vehicle-speed detection signal and in accordance with the instruction limiting the number of engine revolution at the shift position; and executing control of the transmission system in response to the vehicle-speed detection signal. This allows the continuously variable transmission control system of the invention to achieve a satisfactory driving characteristic matching the vehicle-speed detection signal and varies responsiveness when setting the objective number of engine revolution, thus eventually providing a satisfactory driving characteristic matching the requirement of the driver.

To achieve the above object, the system for controlling a continuously variable transmission related to the invention controls the transmission by either expanding or contracting the width of belt channel between a stationary pulley member and a movable pulley member which is axially removably mounted relative to the stationary pulley member to either expand or contract the radius of rotation of the belt wound on the cooperating pair of pulleys for varying the belt drive ratio, in which the control method is comprised of the sequential steps including the following: delivery of a throttle-aperture detection signal and a vehicle-speed detection signal to a controller unit; and determination of an optimum objective number of engine revolution in reference to a first objective number of engine revolution set by the throttle-aperture detection signal and a second objective number of engine revolution set by the vehicle-speed detection signal and, in accordance with the instruction, limiting the number of engine revolution at the shift position to eventually control the transmission system in accordance with the established optimum objective number.

By virtue of the invention, while the vehicle is driven, the continuously variable transmission control system delivers the throttle-aperture detection signal, the vehicle-speed detection signal, and the instruction for limiting the number of engine revolution at the shift position to the controller unit to determine the optimum objective number of engine revolution for executing control of the transmission system. By applying the vehicle-speed detection signal, a specific transmission characteristic can be generated in accordance with the shift position and switches, and at the same time, control responsiveness can be varied by setting the objective number of the engine revolution, thus making it possible for the system to satisfy the driving characteristic required by the driver.

BRIEF DESCRIPTION OF THE DRAWINGS

FIGS. 1 through 7 respectively denote preferred embodiments of the invention wherein:

FIG. 1 is the schematic flowchart representing sequential flow of operation needed for controlling the engine revolution executed by the belt-driven continuously-variable transmission system related to the invention;

FIG 2 is the enlarged sectional diagram of control valves related to the invention;

FIG. 3 is the graphical chart denoting the relationship between pressure and duty ratio of control valves related to the invention;

FIG. 4 is the graphical chart denoting the relationship between pressure and duty ratio of each three-way electromagnetic valve related to the invention;

FIG. 5 is the graphical chart denoting the relationship between vehicle speed and the number of the engine revolution related to the invention;

FIG. 6 is the enlarged sectional diagram of each three-way electromagnetic valve related to the invention; and FIG. 7 is the simplified block diagram of the belt-driven continuously-variable transmission system related to the invention.

DETAILED DESCRIPTION

FIGS. 1 through 7 are respectively the schematic charts and diagrams denoting preferred embodiments of the invention.

Figure 7:
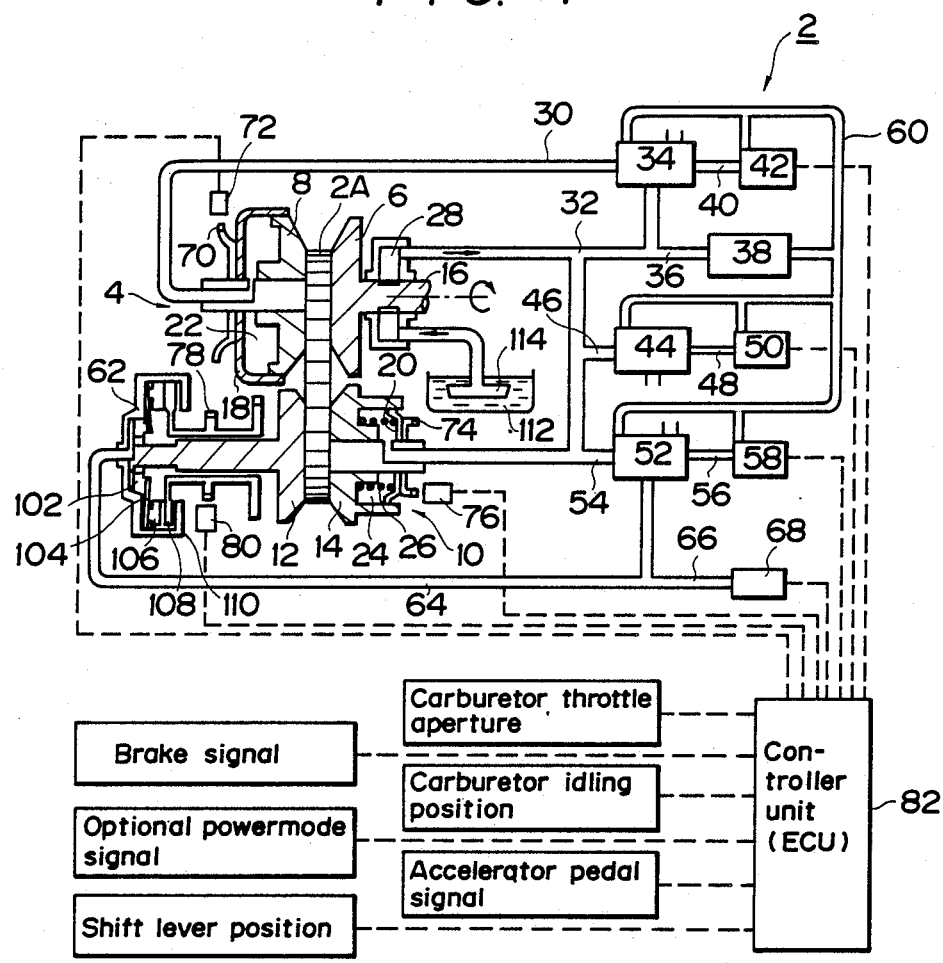

First, refer now to FIG. 7. The continuously variable transmission control system related to the invention typically incorporates the following: a belt-driven continuously variable transmission 2, belt 2A, driving pulley 4 having a side stationary pulley member 6 and a side movable pulley member 8, and driven pulley 10, having a side stationary pulley member 12 and side movable pulley member 14. The driving pulley 4 shown in FIG. 7 is provided with side stationary pulley member 6 nonrotatably secured to the revolving shaft 16 and the side movable pulley member 8 which is movable in the axial direction of the revolving shaft 16 but nonrotatably mounted to it. Like the driving pulley 4, the driven pulley 10 is provided with the side stationary pulley 12 nonrotatably secured to a rotatable shaft and the side movable pulley member 14 nonrotatably secured to axially movable relative to this shaft. First and second housings 18 and 20 are respectively mounted to the side movable pulley member 8 and the side movable pulley member 14. These housings 18 and 20 respectively constitute first and second oil-pressure chambers 22 and 24 An energizing means 26 (i.e. a spring) is provided in an axially extending direction in the second oil-pressure chamber 24 to press against the second housing 20.

Oil pump 28 is driven by the revolving shaft 16, which oil pump 28 is connected to first and second oil-pressure chambers 22 and 24 via first and second oil paths 30 and 32. Primary pressure control valve 34 (which is substantially the transmission control valve) is used for controlling primary pressure, i.e. the input shaft sieve pressure, and is interposed intermediate in the first oil path 30. Constant-pressure control valve 38 which is sized for reducing from 5 through 25 kg/cm² of line pressure to 1.5 through 2.0 kg/cm² of constant pressure is connected to the first oil path 30 across the primary pressure control valve 34 via a third oil path 36 which controls the line pressure mentioned above. A first three-way electromagnetic valve 42 is connected to the primary pressure control valve 34 via a fourth oil path 40 so that the primary pressure can be properly controlled.

Line pressure control valve 44 having a vent-valve function is connected intermediate (i.e., to the top half of) the second oil path 32 via a fifth oil path 46 so that line (pump) pressure can be properly controlled. A second three-way electromagnetic valve 50 is connected to the line-pressure control valve 44 via a sixth oil path 48. Furthermore, a clutch-pressure control valve 52 is connected intermediate (i.e., to the bottom half of) the second oil path 32 and to the chamber 24 via a seventh oil path 54. A third three-way electromagnetic valve 58 is connected to the clutch-pressure control valve 52 via an eight oil path 56 so that the clutch pressure can be properly adjusted.

The primary pressure control valve 34, the first three-way electromagnetic valve 42 which controls the primary pressure, the constant-pressure control valve 38, the sixth oil path 48, the second three-way electromagnetic valve 50 which controls the line pressure, and the clutch-pressure control valve 52 are respectively connected to each other via a ninth oil path 60. The clutch-pressure control valve 52 is connected to an oil-pressure driven clutch 62 via a tenth oil path 64. A pressure sensor 68 is connected intermediate of the tenth oil path 64 via an eleventh oil path 66. Pressure sensor 68 directly detects oil pressure when controlling clutch pressure under HOLD and START modes of the system, thus making a contribution when generating an instruction to apply the detected oil pressure to the objective clutch pressure. In addition, since the clutch pressure is equivalent to the line pressure during the DRIVE mode of the system, direct detection of oil pressure also makes a contribution to the control of line pressure.

Input shaft revolution detecting gear 70 is mounted to the outside of the rotatable first housing 18. A first revolution detector 72 is installed in a position close to the external periphery of the detecting gear 70. Output shaft revolution detecting gear 74 is mounted to the outside of the rotatable second housing 20. A second revolution detector 76 is installed in a position close to the external periphery of the detecting gear 74. The detection signals from the first and second revolution detectors 72 and 76 are respectively delivered to a controller unit 82 so that it can identify the number of the engine revolution and the belt drive ratio.

Oil-pressure driven clutch 62 is provided with gear 78 for transmitting output force. A third revolution detector 80 is installed close to the external periphery of gear 78 for detecting the revolution of the final output shaft. In other words, the third revolution detector 80 detects revolution of the final output shaft which is directly connected to the speed-reduction gear, differential gear, drive shaft, and tires, thus allowing the vehicle speed to be detected. It is also possible for the controller unit to detect revolution of rotary parts in front of and behind the oil-pressure driven clutch, thus making a contribution to detect the amount of clutch slippage as well.

Controller unit 82 is provided for executing overall control of the transmission system. The controller unit 82 varies duty ratio on receipt of a variety of operating conditions including the degree of the aperture of the carburetor throttle (not shown) of the engine, the number of the engine revolution delivered from the first through third revolution detectors 72, 76, and 80, and the speed of the vehicle, for controlling the operating condition of the transmission system. The controller unit 82 also controls for the opening and closing operations of the first three-way electromagnetic valve 42 which controls the primary pressure, the second three-way electromagnetic valve 50 which controls the line pressure, the third three-way electromagnetic valve 58 which controls clutch pressure, and the operation of the pressure sensor 68, respectively.

Next, functions of various signals delivered to the controller unit 82 are described below.

1. Shift-lever position detection signal from motion control shift/selector

This signal controls line pressure, ratios and operation of the clutch needed for implementing those modes including park P, reverse R, neutral N, drive D, and low L by activating signals related to these operational modes.

2. Carburetor throttle aperture detection signal

This signal detects engine torque in reference to memory content preliminarily input to programs and determines either the objective duty ratio or the objective number of the revolutions of the engine.

3. Carburetor idling position detection signal

This signal compensates for the operation of carburetor throttle aperture sensor and then improves the control accuracy.

4. Accelerator pedal position detection signal

This signal detects the intention of the driver by referring to the condition of the depressed accelerator pedal and then determines the direction of control when the driver starts to move the vehicle or during running.

5. Brake signal

This signal detects whether the driver has depressed the brake pedal, or not. If depressed, then the brake signal determines the direction of implementing control-like disengagement of the clutch, for example.

6. Optional power-mode selection signal

This signal allows the driver to optionally select sporty performance or economical running of the vehicle.

Figure 6:
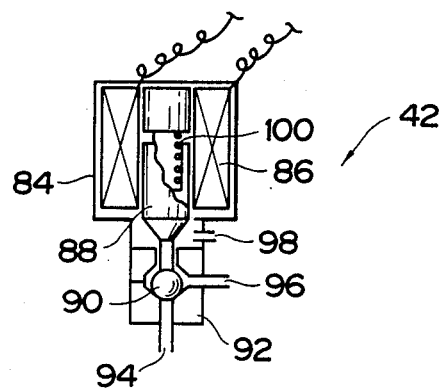

The first through third three-way electromagnetic valves 42, 50, and 58 are respectively provided with a constitution identical to each other Each of these valves is capable of providing adjustable flow therethrough in the flow range between the closed and the fully open position, such as by use of an adjustable solenoid. Referring now to FIG. 6, the constitution of the first three-way electromagnetic valve 42 is described.

The first three-way electromagnetic valve 42 is composed of housing 84, a pair of electromagnetic coils 86 installed inside of housing 84, a plunger 88 which is movably supported between the electromagnetic coils 86, a steel ball 90 engaging the tip of plunger 88, a housing 92 surrounding the steel ball 90, input/output ports 94/96 formed in housing 92, and spring 100 which energizes plunger 88 in the direction to block air from being released. Concretely, when no power is supplied to electromagnetic coils 86, energizing force from spring 100 causes plunger 88 to move downward. Steel ball 90 blocks the input port 94 so that output port 96 and atmospheric port 98 are connected to each other. When power is fed to the electromagnetic coils a magnetic field is generated to cause plunger 88 to ascend against the spring force. This allows the steel ball 90, when the valve is fully opened or fully energized, to block atmospheric pressure port 98 to allow the input port 94 to be connected to output port 96. Normally, steel ball 90 remains in a free condition when power is supplied. Steel ball 90 presses against atmospheric port 98 so that this port can be closed by oil pressure from input port 94.

Refer again to FIG. 7. The oil-pressure-driven clutch 62 includes a piston 102, a ring-shaped spring 104, a first clutch pressurizing plate 106, a friction plate 108, a second clutch pressurizing plate 110, an oil pan 112, and an oil filter 114.

Figure 2:
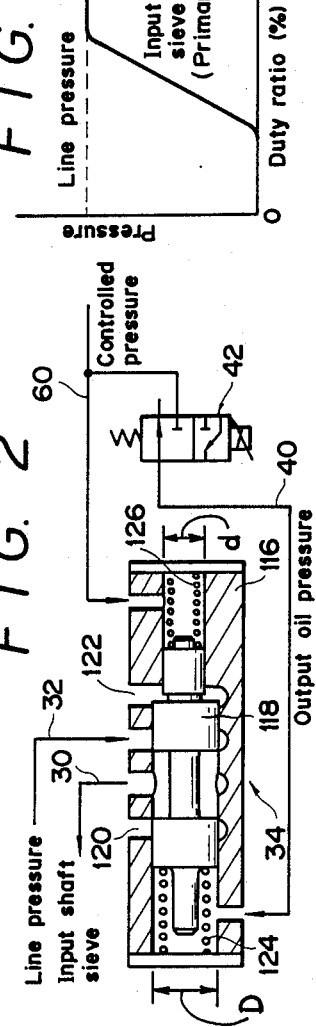

As shown in FIG. 2, the primary-pressure control valve 34 is provided with a spool valve 118 which performs reciprocating movement inside of body unit 116, where the relationship between primary-side diameter D and clutch-side diameter "d" of spool valve 118 is expressed by $D > d$. The body unit 116 shown in FIG. 2 is provided with atmospheric aperture 120, the first oil path 30, the second oil path 32, another atmospheric aperture 122, and the ninth oil path 60, respectively. In addition, the fourth oil path 40 is provided in the bottom left portion. The first and second springs 124 and 126 are respectively set inside of the body unit 116 in order to energize spool valve 118 from both sides so that it can be placed in the predetermined position to inhibit connection of those oil paths between each other as shown in FIG. 2.

Next, the functional operation of the belt-driven continuously variable transmission system of the invention is described below.

Figure 4:
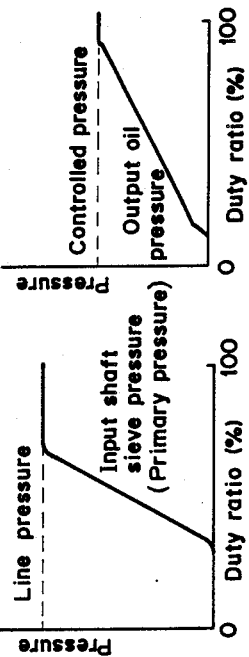
Figure 3:
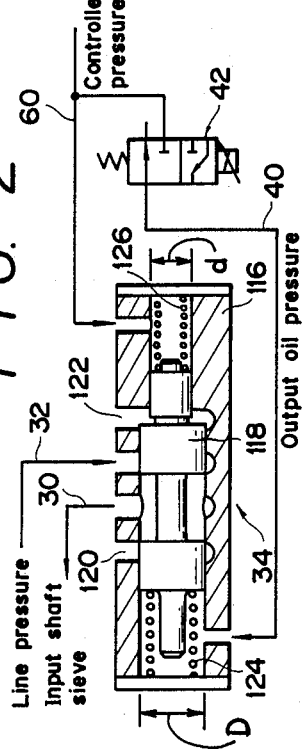
Figure 5:
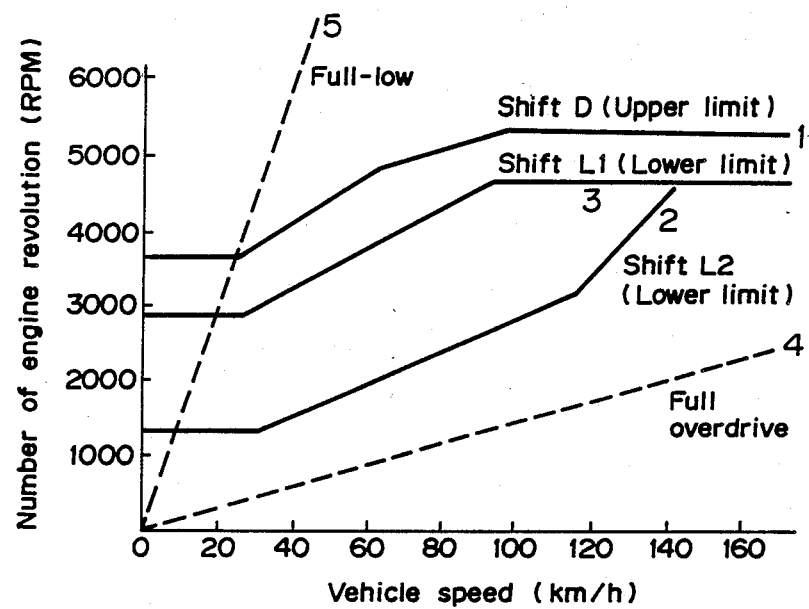

The belt-driven continuously variable transmission system 2 shown in FIG. 7 causes oil pump 28 to operate itself in response to the movement of the revolving shaft 16 so that oil from oil pan 112 is sent to the oil pump 28 through oil filter 114. Line pressure 32 (which is substantially the pump pressure) is controlled by line-pressure control valve 44. However, the line pressure lowers itself if a substantial amount of oil leaks out of the line-pressure control valve 44, i.e., if a considerable amount of oil is vented from this valve 44, then the line pressure lowers. Conversely, if negligible amount of oil leaks out of the line-pressure control valve 44, then the line pressure rises. Refer now to FIGS. 3 and 5. The line-pressure control valve 44 varies the line pressure under the full-low, full-overdrive, and fixed ratio modes, while this valve 44 has characteristic to control transmission in three stages. Operation of the line-pressure control valve 44 is exclusively controlled by the second three-way electromagnetic valve 50, where the line pressure control valve 44 operates itself pursuant to the operation of the second three-way electromagnetic valve 50. The second three-way electromagnetic valve 50 is controlled by a specific duty ratio of a constant frequency. When 0% of duty ratio is present, the second three-way electromagnetic valve 50 is totally inactivated to allow the output side to be atmospherically connected. This reduces the output oil pressure to zero. Conversely, when 100% of the duty ratio is present, the second three-way electromagnetic valve 50 is activated to allow its output side to be atmospherically disconnected, thus generating maximum output of oil pressure identical to the control pressure 60. This allows the duty ratio of valve 50 to vary the output oil pressure 32. As shown in FIG. 4, the second three-way electromagnetic valve 50 has a specific characteristic which is almost linear. This in turn allows the line-pressure control valve 44 to perform an analogue operation and control the line pressure by optionally varying the duty ratio of the second three-way electromagnetic valve 50. Operation of the second three-way electromagnetic valve 50 is controlled by the controller unit 82.

Primary pressure 30 which controls the transmission is controlled by the primary-pressure control valve 34. Like the line-pressure control valve 44, operation of the primary-pressure control valve 34 is exclusively controlled by the first three-way electromagnetic valve 42, and is used for connecting the primary pressure 30 either to the line pressure 32 or to atmosphere (i.e., drain to sump). When the primary pressure is connected to the line pressure, the belt ratio is transferred to full-overdrive side (4). When the primary pressure is atmospherically connected, the belt ratio is transferred to the full-low side (5).

If maximum clutch pressure is needed, clutch-pressure control valve 52 is connected to the line pressure 32, whereas if minimum clutch pressure is needed, clutch-pressure control valve 52 is atmospherically connected. Like the line-pressure control valve 44 and the primarypressure control valve 34, operation of the clutch-pressure control valve 52 is exclusively controlled by the third three-way electromagnetic valve 58, and thus a detailed description thereof is not believed necessary. Clutch pressure 64 is variable between the minimum atmospheric pressure (zero) and the maximum line pressure.

There are four basic patterns for controlling the clutch pressure including the following:

1. Neutral mode

Clutch pressure is zero when the clutch is fully disengaged from pressure at the neutral N or park P shift position.

2. Hold mode

Clutch pressure is held low in order that the clutch can remain in slight contact when the driver has no intention to start off the vehicle by inactivating the throttle with the shift position being set to drive D or reverse R, or when the driver intends to turn off engine torque by reducing the vehicle speed during running.

3. Start mode

Start mode applies an optimum pressure level corresponding to a specific torque generated by the engine (clutch input torque), which prevents the engine from blowing off clutch pressure when engaging the clutch before starting off the vehicle or after disengaging the clutch, and also allows the vehicle to run smoothly.

4. Drive mode

Drive mode applies a substantial pressure level which allows clutch pressure to stably resist engine torque when the clutch is fully engaged in the complete running of the vehicle.

Of those four basic patterns, the neutral mode is implemented by means of an exclusive switching valve (not shown) which interlinks with the shift-handling operation. The other three modes are implemented by controlling the duty ratio of the first through third three-way electromagnetic valves 42, 50, and 58 with the controller unit 82. In particular, when the drive mode is underway, clutch pressure control valve 52 allows the seventh oil path 54 and the tenth oil path 64 to be connected to each other so that the maximum pressure can be generated whereby the clutch pressure 64 is identical to the line pressure 32.

Primary-pressure control valve 34, line-pressure control valve 44, and clutch-pressure control valve 52 are respectively controlled by oil pressure output from the first through third three-way electromagnetic valves 42, 50, and 58. Oil pressure which controls these electromagnetic valves 42, 50, and 58 is substantially constant oil pressure 60 generated by the constant pressure control valve 38. The control oil pressure 60 is constantly lower than the line pressure 32, but it is a quite stable constant pressure. The control oil pressure 60 is introduced to the primary-pressure control valve 34, line-pressure control valve 44, and clutch-pressure control valve 52 in order that performances of these can be stabilized.

Next, the electronic control operation for the belt-driven continuously-variable transmission system 2 is described below. The continuously variable transmission system 2 is controlled by oil pressure, and in addition, in response to the instruction from the controller unit 82, an adequate amount of line pressure which supports the belt and transmits torque, a primary pressure which varies the belt ratio, and a clutch pressure which securely engages the clutch, are respectively and securely maintained.

Figure 1:
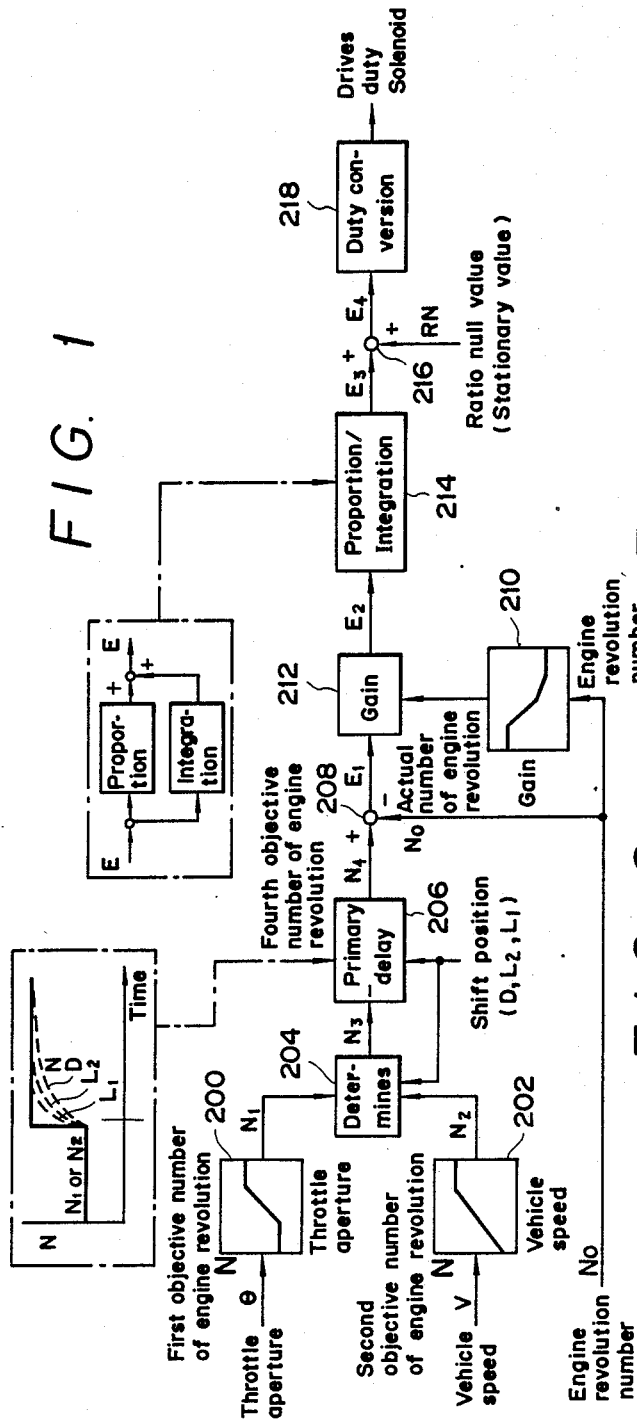

Referring now to FIG. 1, the operation for controlling the engine revolution by applying the belt-driven continuously variable transmission system 2 is described below. First, using a signal which detects the throttle aperture ($\theta$) of the carburetor, a first objective number of the engine revolution N1 is brought from a first table 200 which is not subject to change at the shift position, and simultaneously, using a detection signal from the third revolution detector 80, a second objective number of the engine revolution N2 is brought from a second table 202. The second objective number N2 is assumed to be the upper limit of the shift position like the D-range position for example, whereas the lower limit is assumed to be at positions L1 and L2. This eventually generates the engine revolution range shown in FIG. 5 so that a satisfactory performance characteristic can be maintained.

Next, the controller unit 82 compares the first objective number N1 with the second objective number N2, and then, with due regard to the instruction or criteria (FIG. 5) for limiting the number of the engine revolution at the shift position, the controller unit 82 selects an optimum number of the engine revolution from either the upper limit or lower limit, or from a number between both values (or in other words between the values of $N_1$ and $N_2$ where $N_1$ is below the upper limit or above the lower limit). The controller unit 82 then determines the selected one to be the optimum objective number of the engine revolution N3 at step 204 shown in FIG. 1. The controller unit 82 then determines at step 206 a fourth objective number of the engine revolution N4 by applying a primary delay constant, corresponding to the shift position, to the optimum objective number N3. Note that the primary delay constant causes a variation to take place since time is needed for allowing the optimum objective number N3 to reach the final objective number N4 in accordance with the shift position. The arrival at N4 takes the longest delay of time when the shift position is at D.

Next, when step 208 is entered, the controller unit 82 detects error between the final objective number N4 and the actual number of the engine revolution N0, and then designates this to be a first error E1. If the scope of the first error E1 is substantial, it results in a greater duty ratio, thus causing the primary-pressure control valve 34 to open widely so that the transmission speed can be accelerated.

Next, when step 212 is entered, the controller unit 82 detects a second error E2 by executing multiplication of the first error E1 by the gain determined by the third table 210 corresponding to the actual number of the engine revolution N0. Then, the controller unit 82 detects a third error E3 during step 214 by applying proportional control or integral control (i.e., P.I. control) to the second error E2. When step 216 is entered, the controller unit 82 detects a fourth error E4 by adding a stationary ratio value (a null value RN) to the third error E3. Note that the stationary ratio value RN represents the duty ratio when no variation takes place with the ratio generated by the balance between the primary pressure 30 and the line pressure 32. Next, when step 218 is entered, the controller unit 82 converts the fourth error E4 into a specific duty ratio which excites each of the electromagnetic valves 42, 50, and 58 discussed above.

As a result, the driver can freely select any of those driving performances of the vehicle in accordance with the shift position such as D, L1, or L2, for example. This allows the vehicle to efficiently exert acceleration performance or engine brake effect, thus eventually generating a satisfactory transmission characteristic to provide the driver with practical advantage.

Since it is possible for the continuously-variable transmission control system related to the invention to vary the control responsiveness in accordance with the shift position by applying the vehicle-speed detection signal, the transmission control system can provide the vehicle with a variety of optionally selectable performance characteristics such as sporty performances, or quietness, or economical running, etc. This eventually matches the driving performance characteristic needed for the driver for significantly improving driving convenience.

It should be understood, however, that the invention is not merely limited to those preferred embodiments introduced above, but a variety of changes and modifications may also be implemented by applying the essence of the invention. For example, the above preferred embodiment of the transmission control system related to the invention controls the input values after varying it in accordance with the shift position when delivering the throttle-aperture detection signal and the vehicle-speed detection signal to the control unit. However, the invention also allows the input value to vary itself in accordance with the operation of switches like the drive-characteristic varying switch in place of the shift position to allow the duty ratio to vary itself before eventually executing control over the transmission system.

As is clear from the foregoing description, according to the invention, the continuously-variable transmission control system embodied by the invention delivers the throttle-aperture detection signal and the vehicle-speed detection signal to the controller unit, then determines both a first objective number of the engine revolution by applying the throttle-aperture detection signal and, a second objective number of the engine revolution by applying the vehicle-speed detection signal, and then determines an optimum objective number of the engine revolution in accordance with the instruction for limiting the number of the engine revolution at the shift position for eventually executing control of the transmission system in response to the optimum objective number. As a result, the driver can freely choose driving performance characteristic and/or economy-run characteristic in accordance with the vehicle speed detection signal. This allows the driver to effectively exert acceleration performance and engine brake effect so that satisfactory driving characteristic can be generated. Furthermore, since the vehicle-speed detection signal varies the control responsiveness, the driver can select a variety of driving characteristics such as sporty performances, quietness, and/or economical driving performances according to the shift position, thus fully satisfying specific driving characteristic needed on the part of the driver.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of controlling a continuously variable vehicle transmission which has a movable input part driven by an engine, a movable output part, and ratio control means for drivingly coupling said input part to said output part with a selected drive ratio from a range of drive ratios, said engine having speed control means for facilitating control of the speed of said engine, comprising the steps of:
   detecting a state of said speed control means and determining as a function thereof a first objective engine speed;
   detecting an actual vehicle speed and determining as a function thereof a second objective engine speed;
   detecting which of a plurality of states a motion control selector is in and then selecting a predetermined engine speed range corresponding to said detected state of said motion control selector;
   determining as a function of said first and second objective engine speeds a third objective engine speed which is within said selected engine speed range; and
   causing said ratio control means to vary said selected drive ratio as a function of said third objective engine speed.

2. A method of claim 1 wherein said selected engine speed range is bounded at one end by an upper limit.

3. A method of claim 1 wherein said selected engine speed range is bounded at one end by a lower limit.

4. A method of claim 1 wherein first and second said engine speed ranges respectively correspond to two of said states of said motion control selector and are respectively bounded by an upper limit and a lower limit.

5. A method of claim 1 wherein said step of causing said ratio control means to vary said selected drive ratio as a function of said third objective engine speed includes the step of determining a fourth objective engine speed which changes at a selected rate in response to changes in said third objective engine speed, said ratio control means varying said selected drive ratio as a function of said fourth objective engine speed.

6. A method of claim 5 including the step of selecting said selected rate of change for said fourth objective engine speed as a function of the detected state of said motion control selector.

* * * * *